United States Patent [19] [11] Patent Number: 5,211,327
Clarke et al. [45] Date of Patent: May 18, 1993

[54] METHOD OF WELDING

[75] Inventors: Theodore M. Clarke, Western Springs; Barry Slee, Lake Forest, both of Ill.

[73] Assignee: Case Corporation, Racine, Wis.

[21] Appl. No.: 672,368

[22] Filed: Mar. 20, 1991

[51] Int. Cl.$^5$ ............................................. B21D 39/00
[52] U.S. Cl. .................................... 228/174; 228/242; 219/121.64; 219/121.14
[58] Field of Search .............. 228/174, 164, 170, 175, 228/242; 219/121.13, 121.14, 121.45, 121.46, 121.63, 121.64, 121.84, 121.54, 121.61, 121.62

[56] References Cited

U.S. PATENT DOCUMENTS 3,319,536  5/1967  Kohl et al. ................. 219/121.13
3,704,636  12/1972  Piech ......................... 219/121.13

FOREIGN PATENT DOCUMENTS 2083846  12/1971  France ....................... 219/121.14
0000724  1/1972  Japan ........................ 219/121.14
0016186  4/1974  Japan ........................ 219/121.14
2035872  6/1980  United Kingdom .......... 219/121.13

OTHER PUBLICATIONS

*Metals Handbook Ninth Edition*, vol. 6, pp. 648 and 649, American Society for Metals, 1983.

Primary Examiner—Richard K. Seidel
Assistant Examiner—James Miner
Attorney, Agent, or Firm—Rudnick & Wolfe

[57] ABSTRACT

A method of inhibiting shrinkage related cracking of a weld joint during a weld solidification process comprising the steps of: applying a power beam against abutting surfaces of metal pieces to be welded with an intensity sufficient to cause a predetermined portion of the metal on the pieces to become molten thereby producing the weld joint from the coalescense of metals; and modifying at least one of the metal pieces in an area immediately adjacent and extending along the abutting surfaces to allow weld joint volume to transmute during weld solidification and thereby compensate for and inhibit formation of shrinkage related cracking of the weld joint. Another aspect of this invention relates to the welded assembly resulting from such process. Such welded assembly comprises at least two metal pieces with one metal piece having a relatively narrow ligament extending therefrom in an abutting relationship with a surface on the other metal piece. A surface on the ligament includes at least a portion of a boundary region of the molten metals forming the weld joint. The ligament is configured to flex during weld joint solidification whereby weld joint volume is altered thereby inhibiting shrinkage related cracking of the weld joint.

11 Claims, 2 Drawing Sheets

METHOD OF WELDING

FIELD OF THE INVENTION

The present invention generally relates to welding metal pieces to each other and, more particularly, to a method for inhibiting cracking of a weld joint during a weld solidification process.

BACKGROUND OF THE INVENTION

Welding is a process of joining metal pieces to each other by fusion and involves no metal removal. There are approximately 40 different welding processes used today. These processes can be generally categorized as follows: arc welding; gas welding; resistance welding; brazing; solid-state welding; and "power beam" welding. While each category of welding process has specific benefits relating thereto, the present invention is primarily concerned with "power beam" welding techniques. As used herein, the term "power beam" welding is meant to include electron-beam welding, plasma-arc welding, laser beam welding and/or other "high intensity" welding techniques.

As the power beam impacts and penetrates into the metal pieces, kinetic or electromagnetic energy is converted into thermal energy thereby causing melting of interfacing surfaces on the metal pieces. When solidification of the molten metals occurs, a fusion zone or weld joint results.

Power beam welding processes offer unique performance capabilities and provide a solution to a wide range of joining problems. Advantageously, power beam welding requires no metal removal thereby reducing labor and costs of the joining process. Power beam welding techniques produce a weld joint with a cross-section that is deeper and narrower than those normally resulting from other welding techniques. The ability to attain an extremely high weld depth-to-width ratio permits single-path welding of heavy metal sections. The total heat input per unit length for a given depth of penetration can be much lower when using power beam welding techniques as compared to other welding techniques. This yields a much narrower heat-affected zone, noticeably less distortion, and fewer thermal effects compared to other welding techniques. When conducted in a vacuum or high purity environment, power beam welding minimizes contamination of the metal by oxygen and nitrogen. Moreover, the ability to project a power beam over an elongated distance allows welds to be made in otherwise inaccessible locations.

With power beam welding, rapid travel speeds are possible because of the high melting rates associated with the concentrated heat source. This reduces the time required to accomplish welding and increases the productivity and energy efficiency of the process. Moreover, reasonably square butt joints in thick metal pieces can be welded in one pass without the addition of filler metals. Because the density of the power beam produces welds that are not controlled by thermal conduction, metals of significantly different thermal conductivities can be welded together. As will be understood, other welding techniques or procedures often require the use of preheat for thick sections of metal having a high thermal conductivity, such as aluminum or copper.

Although power beam welding is a high power density process, it is also a low energy process. That is, the energy required by a power beam to form a weld of a given thickness is considerably less than that required by more conventional welding processes. Two advantages can result from the low energy input. First, it minimizes distortion and reduces the size of the weld heat-effected zone. Second, the high cooling rate associated with narrow power beam welds can effect metallurgical reactions, such as phase changes. Although the fundamental rules of metallurgy regarding cooling rates and the resulting microstructure still apply, power beam weld metal will have mechanical properties normally associated with the bulk properties of the microstructure.

The intensity of the power beam is controlled and is capable of instantly penetrating into the work piece and forming molten metal. Metal immediately adjacent to the molten metal is first heated; it expands against the restraining forces of the surrounding cold or boundary base metal; then it cools and contracts as it solidifies. In effect, metal is plasmically deformed during the heating cycle and restrained in tension during cooling. Accordingly, a series of residual tensile and compressive stresses surround the weld joint.

While the strength of weld joint formed with a power beam is usually higher than that of the parts to be welded, the strength of the finished weld joint can be adversely effected by cracking of the weld joint. As will be appreciated, a weld joint having cracks therein may fail when the parts are placed under load. When the welded parts are housed within a casing such as a transmission housing, the failure of the weld joint can result in costly and time involved repairs. Of course, the quality of a weld is difficult to determine without extensive testing procedures.

Thick sections of hardenable steels may crack when power beam welding techniques are used to form the weld joint. Very rapid cooling in the fusion and heat-effected zones also tend to cause shrinkage cracking of the weld joint.

Hot or cold cracks may occur in power beam weld joints in alloys that are subject to these types of cracking. Hot cracking is generally intergranular, and cold cracking is transgranular. Hot cracks form in a low-melting grain boundary phase during solidification of the weld metal. Cold cracks form after solidification as the result of high internal stresses produced by thermal contraction of the metal during cooling. A crack originates at some imperfection or point of stress concentration in the metal and propagates through the grains by cleavage. Stresses within the weld joint can lead to microcracks during weld solidification due to design restrictions on the parts to be welded. A circular weld joint may experience severe constraints.

Sulphur and phosphorous are materials used in many steels to facilitate machining. When the sulphur and phosphorous levels in the metal parts exceed certain levels, they promote low weld ductility and are susceptible to high contraction stresses. As will be understood, during a welding process, sulphur segregates to the grain boundaries and tends to cause cracking of the weld joint. Accordingly, one attempt at solving the weld cracking problem involves reducing the sulphur and phosphorous contents of the metal pieces being welded. Of course, reductions in sulphur and phosphorous levels adversely effect machining operations.

Moreover, when the weld joint is formed between abutting surfaces of two metal pieces, the weld joint often suffers from weld centerline cracking upon solidification. The cracking propagates quickly from the weld root and is substantially undetectable from an outer surface of the weld.

Relatively heavy sections of high strength alloy steels ordinarily must be preheated prior to power beam welding to prevent cracking. As will be appreciated, preheating involves a time consuming laborious process which adds to the overall cost of the welded assembly resulting from the welding process.

It is not unusual to harden functional surfaces on the workpieces to increase their life expectancy. A carburizing heat treatment is one method of hardening the metal pieces or parts. Carbon absorbed from the carburizing heat treatment of the metal pieces, however, assists in crack development. Preheating could prevent the development of high hardness in the weld zone but, to be effective, would probably have to significantly exceed the 180° C. tempering temperature of the carburized parts and cause an unacceptable hardness loss on the carburized surfaces.

Thus, there is a need and a desire to capitalize on the numerous benefits and advantages offered by power beam welding techniques while inhibiting cracking of a weld joint during the weld solidification process.

SUMMARY OF THE INVENTION

In view of the above, and in accordance with the present invention, there is provided a method of capitalizing upon the advantages of power beam welding of metal pieces while inhibiting cracking of a weld joint during a weld solidification process. As will be appreciated, the method or sequence of the present invention may vary somewhat depending upon the particular application requirements. A typical method, however, includes: applying a power beam upon abutting interfacing surfaces of the metal pieces to be welded with an intensity sufficient to cause a predetermined portion of the metal adjacent the surfaces to become heated and melted thereby producing the weld joint from the coalescense of metals; and, modifying at least one of the metal pieces in an area immediately adjacent and extending along the abutting surfaces whereby allowing weld joint volume to transmute during weld solidification and thereby compensate for and inhibit formation of shrinkage related cracking of the weld joint.

In a preferred form of the invention, the modification step involves providing a relatively narrow ligament on one of the metal pieces including at least a portion of a boundary region of the weld joint. In a most preferred form of the invention, a stress relief groove is spaced from the weld joint to define the width of the relatively narrow ligament. The relatively narrow ligament is configured to flex and reduce constraints on the weld joint during weld solidification thereby inhibiting formation of shrink related cracks. The provision of a relatively narrow ligament and its location furthermore retards solidification of the weld joint through the retention of heat. In a preferred form of the invention, the ligament has a width approximately equal to the depth of the weld joint and extends along the abutting surfaces for a distance approximately equal to twice the depth of the weld joint. The method according to the present invention further includes the step of providing a notch blunting slot below the weld joint and extending from one of the abutting surfaces to limit the depth of the weld joint.

In those embodiments wherein a stress relief groove is provided on one side of the ligament, the elongated slot is preferably located such that the depth of the weld joint is less than the depth of the relief groove. The present invention may further include the step of venting the elongated slot to permit gases to escape therefrom.

As discussed above, metallurgical factors known to contribute to precrack susceptibility include the absorption of carbon from the carburizing heat treatment. Accordingly, the method according to the present invention may further include the step of providing noncarburized surface areas on abutting areas of the metal pieces where the weld joint is formed.

As will be appreciated, the above process or method results in a welded assembly. According to the present invention, the welded assembly comprises at least two metal pieces, each having generally heavy sections defining generally parallel and abutting surfaces. At least one of the metal pieces includes a relatively narrow ligament extending therefrom in an abutting relationship with a surface on the other metal piece. The welded assembly further includes a weld joint produced from a coalescence of molten metals derived from heating abutting surfaces on the metal pieces with a power beam. The ligament includes a boundary region of the molten metals forming the weld joint and is configured to flex and transmute weld joint volume during weld solidification thereby inhibiting shrinkage cracking of the weld joint.

In one form of the invention, one of the metal pieces is a shaft and the other metal piece is a gear. In this embodiment, the ligament has a generally annular configuration and is defined by an extension of the shaft or gear. Moreover, at least one of the pieces further defines an annular notch blunting slot located to limit the depth of the weld joint. To permit gas to escape therefrom, the slot is vented as by passageways defined by the metal piece having the slot.

To facilitate fixturing of the metal pieces to be welded, the method of the present invention further includes spot welding the metal pieces to each other prior to producing the weld joint with the power beam. Moreover, the method of inhibiting cracking of a circular weld joint comprises the further step of ramping down the application of the power beam after turning the metal pieces at least 360°.

The method of the present invention capitalizes on the many advantages offered by power beam welding while inhibiting cracking of the weld joint during weld solidification without requiring expensive and time consuming preheat treatments. Moreover, the method of the present invention allows metals having normal levels of sulphur and phosphorus to be welded while inhibiting cracking of the weld joint during the weld solidification process. The method offered by the present invention minimizes stresses by configuring the parts such that the weld joint volume is altered during the weld solidification process. The sharp notch normally left against a root of a partially penetrating butt weld, which can promote fatigue failure, is successfully blunted by the notch blunting slot on the metal pieces at the weld root tip. Moreover, the method of ramping down the power beam upon completion of a circular weld joint furthermore minimizes cracking problems.

In a most preferred form of the invention, the coalescense of metals is obtained by applying a concentrated coherent light or laser team against and in the abutting surface area of the metal pieces. Using a laser as the power beam offers several advantages. Laser beam welding is a non-contact process which substantially eliminates distortion. Because contact with the workpieces is not necessary, weld joints in restricted areas can be formed provided that a line of sight to the weld is provided. The absence of contact makes laser beam welding ideal for use in high speed, automated welding systems.

Numerous other features and advantages of the present invention will become readily apparent from the following detailed description, the accompanying drawings, and the appended claims.

DETAILED DESCRIPTION OF THE PRESENT INVENTION

Figure 1:
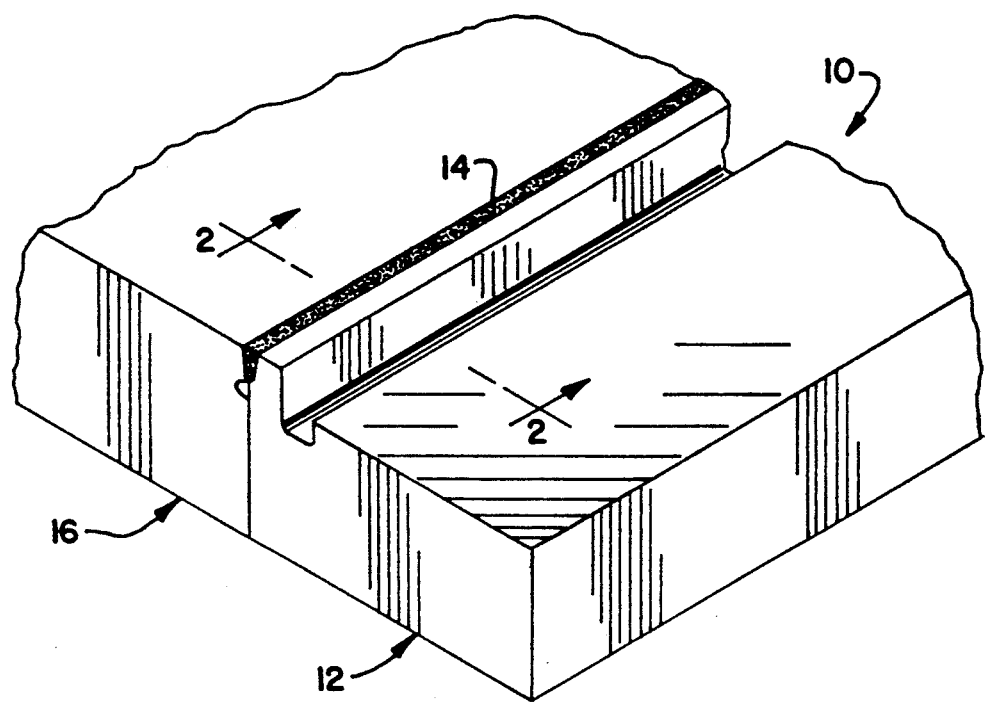
FIG. 1 schematically illustrates one form of a welded assembly embodying principles of the present invention to inhibit cracking of a weld joint.

While the present invention is susceptible of embodiment in various forms, there are shown in the drawings, and will hereinafter be described, presently preferred embodiments of the invention with the understanding that the disclosure is to be considered as setting forth exemplifications of the invention which are not intended to limit the invention to the specific embodiments illustrated.

There is schematically illustrated in FIG. 1 one form of a welded assembly 10 which is the product of a process described in detail hereinafter. In the illustrated form, a first relatively heavy metal piece or plate-like member 12 is secured along a weld joint to a second relatively heavy metal piece or plate-like member 16. Both metal pieces 12 and 16 are fabricated from a low carbon alloy steel such as 16 MNCR 5 steel which is substantially equivalent to an 8620 grade steel.

Figure 2:
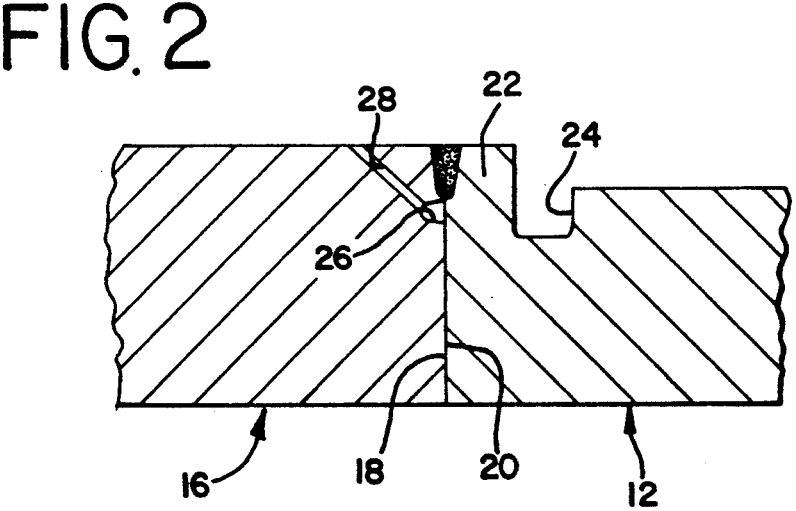
FIG. 2 is an enlarged schematic sectional view of a weld joint configuration taken along line 2—2 of FIG. 1.

In the illustrated embodiment, and as shown in FIG. 2, the metal pieces 12 and 16 are provided with interfacing surfaces 18 and 20, respectively. The interfacing surfaces 18 and 20 generally correspond in their configurations. Moreover, when the metal pieces 12, 16 are fixtured for assembly, the two surfaces 18 and 20 coming together extend generally parallel to each other. It will be appreciated, however, that surfaces 18 and 20 may take varied shapes or forms as long as such shape or form allows the metal pieces 12 and 16 to be closely fitted relative to each other in an abutting relationship.

As shown, at least one of the metal pieces 12, 16 is modified in an area adjacent an abutting surface thereof. In the illustrated embodiment, member 12 is provided with a relatively narrow ligament 22 extending therefrom and including at least a portion of a boundary region of the weld joint 14. As shown, the ligament 22 extends along the abutting surfaces of the metal pieces a distance approximately equal to twice the depth of the weld joint. Although the width of ligament 22 is schematically illustrated and, preferably, is generally consistent, from an understanding of the present invention, it will be appreciated that the width of ligament 22 may vary as long as the ligament is flexible in the manner described hereinafter. In a most preferred form of the invention, a stress relief groove 24 is provided to define the width of ligament 22. Groove 24 is approximately equal in depth to twice the depth of the weld joint 14.

One of the metal pieces 12, 16 furthermore defines a notch blunting slot 26. In the illustrated embodiment, slot 26 is formed in metal piece 16 and extends in an elongated fashion along and from surface 20. For purposes described in detail hereinafter, slot 26 is vented as with passageways 28.

The process for welding metal pieces 12 and 16 to each other involves the following steps. Initially, the interfacing surfaces 18 and 20 of metal pieces 12 and 16, respectively, are arranged in an abutting relationship relative to each other. A metal-to-metal fit between the parts is desirable but often difficult to obtain. As will be appreciated, and although the surfaces 18 and 20 extend generally parallel to each other, when the metal pieces 12 and 16 are abutted against each other, there may be a gap or opening between the faying surfaces.

One feature of the present invention, however, is to limit welding to those metal pieces having a gap between any portion of the abutting interfacing surfaces which is less than a predetermined percentage of the power beam diameter at the abutting area whereat the power beam impinges upon the metal pieces. The acceptable gap for a particular application can depend upon the power beam process employed, the type of base metal, the thickness of the joint, and the required weld quality. In a preferred method, welding is limited to those metal pieces having less than a 0.05 mm gap between any portion of the abutting interfacing surfaces.

After the metal pieces are fixtured such that surfaces 18 and 20 are arranged in an abutting relationship relative to each other, a power beam is directed against the metal pieces in the abutting surface area with an intensity sufficient to cause metal adjacent the surfaces to become heated and melt thereby producing the weld joint 14 from the coalescense of metals. In a preferred form of the invention, a Trumpf TLF 5000 laser welder, capable of emitting a concentrated coherent light or laser beam is used to form the weld joint. The laser beam is simultaneously applied against the metal pieces with an intensity sufficient to cause metal adjacent a predetermined portion of each abutting surface to become molten thereby producing the weld joint from the coalescense of metals.

The Trumpf TLF 5000 laser welder is a conventional machine using a 5 kW, $CO_2$, fast axial flow and RF excited laser. The nominal output beam diameter within 1 m of the laser output window is about 28 mm. A laser beam welder is preferred from a metal working point of view because of their line-width, divergence, coherence, and focusability. Perhaps the most important characteristic of a laser is that the output or power beam is highly directional and collimited. Because the laser beam is collimited (its angular spread is small), it can be collected by a lens and focussed to a small area. Considering the variety of lasers that are available for welding purposes, the selection of a given laser type and/or power level can be expected to encompass many selection criteria.

Beam focussing optics were used to focus the power beam on the abutting areas of surfaces 18 and 20. In one form, a Zeiss laser gun, type LBK-PE 1 with a beam expander and a reflective optic, allowing a work standoff of 250 mm, was used to focus the power beam. Calculation showed that these focussing optics gave a focussed spot size of approximately 0.2 mm diameter.

When the power beam impinges upon the adjacent and abutting surfaces of the metal pieces 12 and 14, part of its energy is absorbed, and part is reflected. The energy that is absorbed heats the abutting surfaces. If this energy is sufficient, melting occurs.

Laser beam welding with a high-power continuous wave $CO_2$ laser is most effective in the deep-penetration or keyhole mode, in which the laser melts a small volume of material. During the welding mode, the intense energy concentration at the abutting surfaces induces local vaporization. Metal is progressively melted at the leading edge of the molten metal pool. As the power beam is moved along the abutting interfacing surfaces to be welded, the molten metal flows around the deep penetration cavity and solidifies along the rear side. The size of the weld joint is stabilized by a balance between the energy density of the laser beam and the welding speed. Thus, the energy density of the laser beam at the workpiece and the welding speed must be chosen to complement each other.

Welding conditions involved relative movement between the power beam and the abutting area at approximately 1.4 m/minute with the power beam approximating 4.5 kW. Laser shielding gas was provided by a 4 mm diameter nozzle set an angle of approximately 45° to the weld joint and approximately 15 mm from the weld joint. This provided a gas stream which encompassed the weld joint and the trailing edge of the weld. Helium shielding gas was used at a flow rate of 30 liters/minute.

A salient feature of the present invention is applicant's appreciation that appropriately shaping the metal parts to be welded inhibits shrinkage cracking of the weld joint parallel to the interface being welded during weld solidification. As discussed, stresses within the weld joint may lead to microcracks during weld solidification due to design restrictions on the parts to be welded.

Designing at least one of the metal pieces with a configuration in accordance with the scope of the present invention in an area immediately adjacent to the molten metal and extending along the abutting surfaces to allow weld joint volume to alter or transmute during weld solidification compensates for and inhibits formation of shrinkage cracks during weld solidification. According to the most preferred form of the present invention, ligament 22 is sized with a length extending generally parallel to the direction of power beam application and measuring approximately twice the depth of the weld joint and having a width measuring approximately the depth of the weld joint. As will be appreciated, the location and configuration of the ligament 22 allows the ligament to flex thereby reducing constraints and minimizes stress on the weld joint during weld solidification.

As will be appreciated, the relatively heavy sections of metal on the pieces 12, 16 tend to draw heat away from the weld joint resulting in rapid cooling thereof. Because of its location, ligament 22 is heated through conduction. Providing a relatively narrow ligament 22 of the type described on at least one of the metal pieces retards solidification of the weld joint through retention of heat therein thereby furthering inhibition of the weld joint to cracking during weld solidification process.

The present invention further includes the process of providing the notch blunting slot 26 below the weld joint to limit the depth thereof. The notch blunting slot 26 is located such that the depth of the weld joint is less than the depth of the relief groove 24. Because of the intense heat in vaporization of the metals, passageway 28 allow gases entrapped within slot 26 to escape therefrom thereby avoiding voids and other imperfections in the weld joint.

The metal pieces which are to be welded are often hardened through a carburization process prior to welding. Carbon absorbed from the carburizing heat treatment is expected to assist in developing crack formations in the weld joint. Accordingly, in those instances where carburized metal parts are to be welded, an additional step in the welding process of the present invention includes: providing non-carburized surface areas on abutting areas of the metal pieces where the weld joint is formed. Preferably, abutting areas of the metal pieces where the weld joint is formed are masked off to prevent carbon absorption during the carburizing heat treatment.

Figure 3:
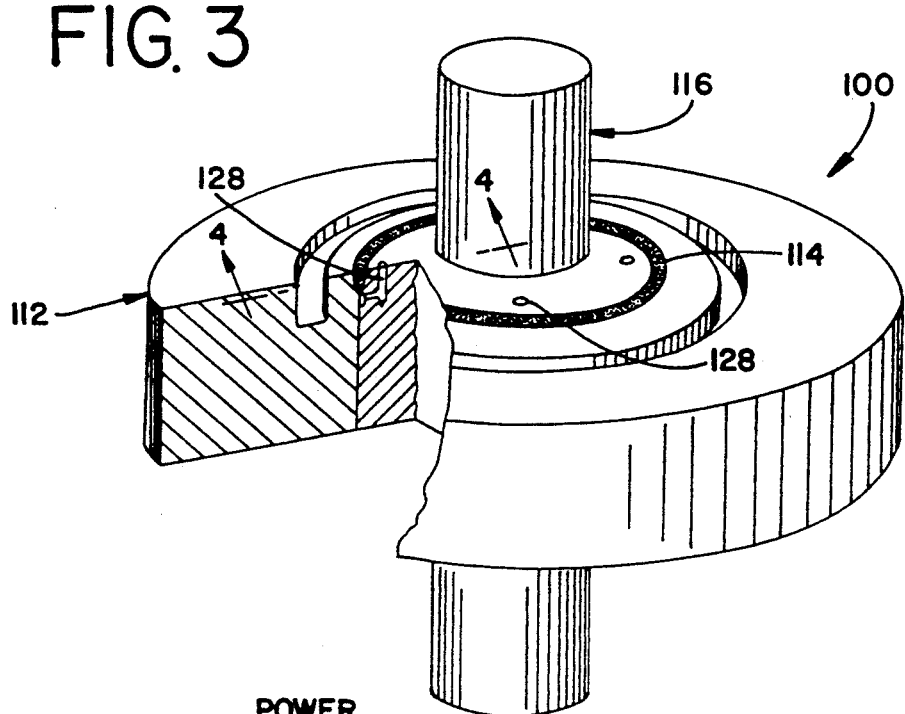
FIG. 3 schematically illustrates another form of a welded assembly embodying principles of the present invention.

FIG. 3 shows another form of welded assembly 00 which is a product of the improved welding technique according to the present invention. As shown in FIG. 3, a relatively heavy section of a disc shaped metal piece 112, such as a gear or the like, is secured along a circular weld joint 114 to a relatively heavy section of a metal shaft 116. Piece 112 and shaft 116 are fabricated from the same or substantially similar materials to that discussed above.

Figure 4:
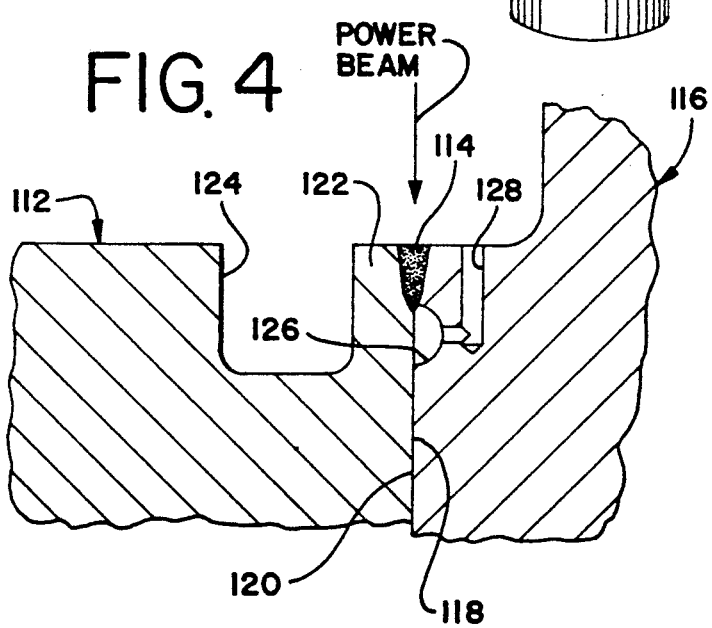
FIG. 4 is an enlarged schematic sectional view taken along line 4—4 OF FIG. 3.

In the illustrated embodiment, and as shown in FIG. 4, gear 112 and shaft 116 are provided with interfacing surfaces 118 and 120. While extending generally concentric relative to each other, the interfacing surfaces 118 and 120 likewise extend generally parallel to each other along their abutting surfaces. Such configuration allows the gear 112 and shaft 116 to be closely fitted relative to each other in an abutting relationship.

As shown, gear 112 is modified in an area adjacent the abutting interfacing surfaces 118 and 120. In this embodiment, gear 112 is provided with a relatively narrow and annular ligament 122 including at least a portion of a boundary region of the weld joint. As shown, the annular ligament extends along the abutting interface for a distance approximately equal to twice the depth of the weld joint 114. As in the first embodiment, the width of the ligament may somewhat vary as long as the ligament is compliant in the same manner as described above. In a most preferred form of the invention, an annular stress relief groove 124 is provided to define the width of the annular ligament 122. The annular groove 124 is approximately equal to twice the depth of the weld joint.

In this second embodiment, shaft 116 defines an annular notch blunting slot 126. Slot 126 extends in an annular fashion along and about surface 120. To permit gases to escape therefrom, slot 126 is vented as with passageways 128.

The process for welding gear 112 and shaft 116 to each other along the circular weld joint 114 involves substantially the same steps as described above. In the illustrated embodiment, a rotary table, with an adjustable speed control was used to rotate the metal pieces 112, 116 beneath the focussed power beam which is applied in an axial direction relative to the longitudinal axis of shaft 116. Preferably, the laser gun was positioned at an angle of 12° relative to the longitudinal axis of shaft 116. At an angle of 90° to the gun angle, the axis of the rotary table was tilted at 14° to the longitudinal axis of shaft 116. Laser shielding gas was provided by a 4 mm diameter nozzle set an angle of 45° to the weld joint and approximately 15 mm from it. This provided a gas stream which encompassed the weld joint and the trailing edge of the weld. Helium shielding gas was used at a flow rate of 30 liters/minute. Welding conditions involved moving the metal pieces at approximately 1.4 m/minute with the power beam approximating 4.5 kW.

A circular weld joint such as 114 may experience more severe constraints than that associated with the embodiment illustrated in FIGS. 1 and 2. Providing the annular ligament 122 with a length extending parallel to the direction of application of the power beam and having about a two-to-one length to width ratio as compared to the depth of the weld joint allows the joint volume to transmute and compensate for the annular configuration of the metal pieces during weld solidification thereby inhibiting shrinkage cracking of the weld joint. As will be appreciated, the configuration of the annular ligament 122 allows flexing thereby reducing constraints and minimizing stresses on the weld joint during weld solidification.

The above-identified steps in the welding process can be supplemented by spot or tack welding the metal pieces 112 and 116 to each other prior to producing the weld joint 14. Fixturing time and costs are often substantially reduced by the effective use of spot welds. In the preferred embodiment, three welds, each extending about 5–6 mm long and spaced approximately 120° apart, are used to arrange the metal pieces 112 and 116 relative to each other. The spot welds can be made at the welding speed used for forming the weld joint 114, but with the laser power reduced by 1 kW.

The method for inhibiting cracking of a weld joint may comprise the further step of ramping down the laser power after the metal pieces 112 and 116 have turned 360°. It has been found that shutting the power beam off without ramping down the laser power results in a weld crater and crater cracking. Continuing the travel, after 360°, while the laser power is gradually ramped down eliminates the crater. In the preferred embodiment, laser power ramp down was initiated two seconds after completion of the weld overlap. The ramp down occurred over a three second period and was from 100 percent of the set welding power down to approximately 1 percent.

Figure 5:
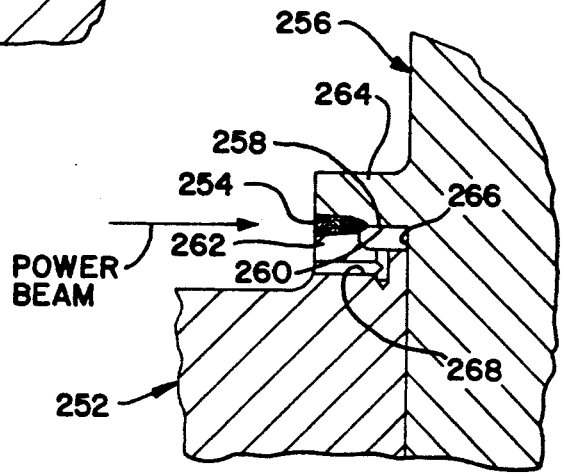
FIG. 5 is an enlarged schematic sectional view similar to FIG. 3 showing another alternative weld joint configuration.

FIG. 5 schematically illustrates another alternative form of the welded assembly which is a product of the above-described welding process. In this alternative form, a metal piece such as a disc-shaped member 252 is welded along a continuous circular weld joint 254 to a metal shaft 256 by focusing and directing a power beam radially relative to the longitudinal axis of shaft 256. Member 252 and shaft 256 are provided with interfacing surfaces 258 and 260, respectively, and are fabricated from the same or substantially similar materials to that discussed above.

Moreover, the metal pieces 252 and 256 are modified in an area adjacent the weld joint to inhibit shrinkage cracking of the weld joint during weld solidification. In the illustrated embodiment, member 252 is provided with an annular extension 262 which axially extends from a generally planar surface on member 252 and defines abutting surface 258. Shaft 256 is provided with a ligament or radial flange 264 specifically in accordance with that mentioned above and defining abutting surface 260 and includes at least a portion of a boundary region of the weld joint 254. The configurations of annular extension 262 and the ligament or radial flange 264 allows the parallel and generally concentric surfaces 258 and 260 to be arranged in abutting relationship relative to each other.

One of the metal pieces 252 and 256 defines an annular notch blunting slot 266. In the illustrated embodiment, slot 266 is defined by annular extension 262 extends in an annular fashion about and from the parallel surface 260 defined by shaft 256. To facilitate the removal of gases within slot 266, a series of passages 268 are provided for venting the slot 266.

The process for welding metal pieces 252 and 256 to each other involves substantially the same steps as described above except that the power beam is directed radially toward the abutting interfacing surfaces. Notably, the annular ligament 262 extending from one of the metal pieces and including a boundary region of the molten metals forming the weld joint is configured to flex to minimize stresses on the weld joint during Weld solidification thereby inhibiting shrinkage related cracking of the weld joint.

The process of the present invention inhibits cracking of weld joints formed in metal pieces having relatively normal levels of phosphorous and sulfur rather than requiring special and more costly alloy steels with very low levels of phosphorus and sulfur. Besides inhibiting stress related cracking, therefore, the ability to produce weld joints in metals having relatively normal levels of sulphur and phosphorous furthermore facilitates machining of the metal pieces.

Moreover, the process of the present invention eliminates the heretofore known process of preheating thick sections of hardenable steel pieces so as to avoid cracking during weld solidification of a power beam welded joint. The method of providing a relatively narrow ligament including a boundary region of the molten metals forming the weld joint and which is configured to flex reduces the constraints on the weld joint during weld solidification and inhibits formation of shrinkage related cracking of the weld joint parallel to the interface being welded. In one form of the invention, a stress relief groove is provided on one of the metal pieces to define the thickness of the ligament. The ability of the ligament to flex minimizes stresses on the weld joint during weld solidification and allows weld joint volume to alter or transmute during weld solidification thereby compensating for and inhibiting formation of shrinkage related cracking of the weld joint.

The method of the present invention further involves providing a notch blunting slot below the weld joint and extending from one of the abutting surfaces on the metal pieces. The notch blunting slot limits the depth of the weld joint. Moreover, the notch blunting groove reduces stress concentration at the root of the weld joint thereby inhibiting shrinkage cracking which may not be totally prevented by providing a ligament alone.

The use of a power beam to form the weld joint allows the full properties of carburized hardened and base metals to be retained on functional surfaces very close to the power beam weld zone. The process step of providing non-carburized surface areas on the abutting areas of the metal pieces where the weld joint is formed further reduces the likelihood of crack formations. When the advantages of power beam welding are coupled with the ability to inhibit crack formation during the weld solidification process, it produces a strong and efficient welded assembly at an economical manufacturing cost.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A method of inhibiting shrinkage cracking of a weld joint during a weld solidification process comprising the steps of:
   abutting interfacing surfaces defined by metal pieces to be welded;
   directing a power beam against the abutting area of said interfacing surfaces with an intensity sufficient to cause metal adjacent said surfaces to become heated and melt thereby producing a weld joint from the coalescence of metals;
   providing a relatively narrow ligament on one of said metal pieces including at least a portion of a boundary region of said weld joint, and with said ligament being configured with a length extending generally parallel to the direction of the power beam and measures about two times the depth of the weld joint and a width which measures about the depth of the weld joint whereby the ligament is allowed to flex and reduce constraints on the weld joint during weld solidification thereby inhibiting formation of shrinkage related cracking of the weld joint; and
   providing an elongated slot below the weld joint and extending from one of the abutting surfaces to limit the depth of the weld joint.

2. The method of inhibiting cracking of a weld joint according to claim 1 comprising the further step of:
   limiting welding to those metal pieces having less than about a 0.05 mm gap between any portion of the abutting interfacing surfaces.

3. A method of producing a weld joint that will not crack during a weld solidification process, said method comprising the steps of:
   abutting generally corresponding surfaces defined by two metal pieces to be welded;
   applying a power beam simultaneously against said metal pieces with an intensity sufficient to cause metal adjacent a predetermined portion of each abutting surface to become molten thereby producing said weld joint from the coalescence of metals;
   limiting the root depth of said weld joint; and
   providing a stress relief groove on one of said metal pieces, said groove being spaced from said weld joint to define a relatively narrow ligament immediately adjacent to the molten metal producing said weld joint, and wherein said ligament is configured with a length extending parallel to the direction of power beam application and equal to about two times the depth of the weld joint and a width equal to about the depth of the weld joint such that said ligament is permitted to flex and thereby minimize stresses on the weld joint during weld solidification thereby inhibiting shrinkage related cracking of the weld joint.

4. The method of producing a weld joint according to claim 3 wherein limiting the root depth of said weld joint includes the step of:
   providing an elongated slot below the weld joint and extending from and along the abutting surface of the other of said metal pieces.

5. A method of producing a weld joint that will not crack during a weld solidification process comprising the steps of:
   applying a concentrated coherent light beam upon abutting surfaces of metal pieces to be welded with an intensity sufficient to cause a predetermined portion of the metal on said pieces to become molten thereby producing said weld joint from the coalescence of metals; and
   providing at least one of said metal pieces with a configuration including a ligament defining a portion of a boundary region of the weld joint and having a length extending parallel to the direction of light beam application and a width equal to about the depth of the weld joint in an area immediately adjacent to and extending along said abutting surfaces, and wherein said ligament flexes to allow weld joint volume to transmute during weld solidification and thereby compensate for and inhibit formation of shrinkage related cracking of the weld joint parallel to the interface being welded.

6. The method of producing a weld joint according to claim 5 comprising the further step of:
   limiting the root depth of said weld joint by providing an elongated slot in one of said metal pieces below the weld joint and extending from one of the abutting surfaces thereon.

7. The method of producing a weld joint according to claim 6 comprising the further step of:
   venting said slot to permit gas to escape therefrom.

8. A method of inhibiting cracking of a continuous circular weld joint between a metal shaft and a metal member joined to said shaft by said weld joint, said method comprising the steps of:
   producing said circular weld joint from a coalescence of molten metals obtained by applying a concentrated coherent light beam upon adjacent and generally corresponding surfaces defined by said shaft and said member; and
   providing a relatively narrow annular ligament extending from one of said shaft and said metal member and including at least a portion of a boundary region of said circular weld joint and configured with a length extending parallel to the direction of light beam application and measuring approximately two times the depth of the weld joint and with a width measuring approximately the depth of the weld joint, and wherein the annular ligament is designed to flex thereby allowing weld joint volume to transmute and minimize stresses during weld solidification thereby inhibiting shrinkage related cracking of the weld joint; and
   limiting the root depth of said circular weld joint to less than the distance said annular ligament extends from one of said shaft and said metal member.

9. The method for inhibiting cracking of a circular weld joint according to claim 8 comprising the further step of:
   spot welding said member to said shaft prior to applying the light beam upon adjacent surfaces of said shaft and member to produce said circular weld joint.

10. A method for inhibiting cracking of a circular weld joint comprising the steps of:

producing said circular weld joint from a coalescence of molten metals obtained by applying a concentrated coherent light beam upon adjacent and generally corresponding surfaces defined by a shaft and a member; and providing a relatively narrow annular ligament extending from one of said shaft and said metal member and including at least a portion of a boundary region of said circular weld joint and configured to flex thereby allowing said weld joint volume to transmute and minimize stresses during weld solidification thereby inhibiting shrinkage related cracking of the weld joint;

limiting the root depth of said circular weld joint to less than the distance said annular ligament extends from one of said shaft and said metal member; and ramping down the application of said light beam upon said adjacent surfaces after turning said shaft and said member 360 degrees.

11. A method for inhibiting shrinkage related cracking of a weld joint provided between two carburized metal pieces, said method comprising the steps of:

providing noncarburized surface areas on abutting areas of the metal pieces where the weld joint is formed;

directing a laser beam toward and along a line defined by the abutting areas on said metal pieces with an intensity sufficient to cause metal on both pieces to become molten thereby producing said weld joint from the coalescence of metals;

providing an elongated slot below the weld joint and extending from one of the abutting surfaces to limit the depth of the weld joint; and providing a relatively narrow ligament on at least one of said metal pieces to retard solidification of the weld joint through retention of heat therein, said ligament extending from said one of said metal pieces and includes at least a portion of a boundary region of said molten metals forming the weld joint, and wherein the ligament provided is specifically sized with a length extending from at least one of the metal pieces parallel to the direction of the laser beam for a distance approximately twice the depth of the weld joint and has a width approximately the depth of the weld joint such that the ligament flexes and whereby reduces constraints on the weld joint during weld solidification thereby inhibiting shrinkage cracking of the weld joint.

* * * * *